United States Patent
Furukawa (10) Patent No.: US 8,717,501 B2
(45) Date of Patent: May 6, 2014

(54) VIDEO DISPLAY APPARATUS, VIDEO DISPLAY METHOD, AND PROGRAM

(75) Inventor: Takeshi Furukawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 125 days.

(21) Appl. No.: 13/303,643

(22) Filed: Nov. 23, 2011

(65) Prior Publication Data

US 2012/0133837 A1    May 31, 2012

(30) Foreign Application Priority Data

Nov. 29, 2010   (JP) .................................. 2010-265343

(51) Int. Cl.
*H04N 5/21*   (2006.01)
*H04N 5/14*   (2006.01)

(52) U.S. Cl.
CPC . *H04N 5/21* (2013.01); *H04N 5/145* (2013.01)
USPC ..................................... 348/607; 348/E5.066

(58) Field of Classification Search
CPC ........ H04N 5/21; H04N 5/145; H04N 9/3197
USPC .......................................................... 348/607
See application file for complete search history.

(56) References Cited

U.S. PATENT DOCUMENTS

| | | | |
|---|---|---|---|
| 2009/0066648 A1* | 3/2009 | Kerr et al. | 345/158 |
| 2009/0207322 A1* | 8/2009 | Mizuuchi et al. | 348/745 |
| 2009/0284714 A1* | 11/2009 | Kogo et al. | 353/48 |
| 2010/0045570 A1* | 2/2010 | Takata | 345/4 |
| 2011/0116055 A1* | 5/2011 | Nakamura et al. | 353/82 |

FOREIGN PATENT DOCUMENTS

JP   2001-094900 A   4/2001

* cited by examiner

*Primary Examiner* — Jefferey Harold
*Assistant Examiner* — Justin Sanders
(74) *Attorney, Agent, or Firm* — Canon USA, Inc., I.P. Division (57) ABSTRACT

A video display apparatus includes a video display unit configured to display a video image, a viewer detection unit configured to detect a position of a viewer, a moving speed measurement unit configured to measure a moving speed of the viewer, a display area determination unit configured to determine, based on the position and moving speed of the viewer, a video display area where the video image is displayed on the video display unit, and a video control unit configured to display the video image in the video display area determined by the display area determination unit.

21 Claims, 9 Drawing Sheets

VIDEO DISPLAY APPARATUS, VIDEO DISPLAY METHOD, AND PROGRAM

BACKGROUND OF THE INVENTION

1. Field of the Invention

The present invention relates to a video display apparatus, a video display method, and a program which provide a video image while changing a video display area where the video image is displayed.

2. Description of the Related Art

In recent years, display panels, such as a liquid crystal display (LCD) and a plasma display panel (PDP), have been becoming larger and larger, leading to wide prevalence of video display apparatuses which display a plurality of sub-screens on the single display panel thereof. Further, according to the increase in the sizes of display panels, there has been proposed a viewing style displaying a sub-screen with use of a part of a display panel and allowing a viewer to view it.

As a related art to this viewing style, Japanese Patent Application Laid-Open No. 2001-094900 discusses a technique of determining a display position on a display apparatus based on a viewing position of a viewer. According to this technique, it is possible to provide an easily viewable video image by determining the display position based on the viewing position of the viewer.

However, there is a concern about the above-described video display apparatus. When such a video display apparatus provides a video image to a moving or walking viewer, the viewer may be preoccupied by the provided video image, and therefor may collide with an obstacle that exists in the viewer's path. For example, if a video image is offered by a video display apparatus used in, for example, a digital signage set up at a crowded public institution such as a train station, a viewer, who is preoccupied with the video image, may collide with an obstacle such as another pedestrian.

SUMMARY OF THE INVENTION

The present invention is directed to providing a video image while reducing the possibility that a moving or walking viewer may collide with an obstacle.

According to an aspect of the present invention, a video display apparatus includes a video display unit configured to display a video image, a viewer detection unit configured to detect a position of a viewer, a moving speed measurement unit configured to measure a moving speed of the viewer, a display area determination unit configured to determine, based on the position and moving speed of the viewer, a video display area where the video image is displayed on the video display unit, and a video control unit configured to display the video image in the video display area determined by the display area determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 6A and 6B illustrate a trapezoidal correction performed by a video display apparatus according to a third exemplary embodiment, and in particular, FIGS. 6A and 6B are a top view and a front view, respectively.

DESCRIPTION OF THE EMBODIMENTS

Various exemplary embodiments, features, and aspects of the invention will be described in detail below with reference to the drawings.

Figure 1:
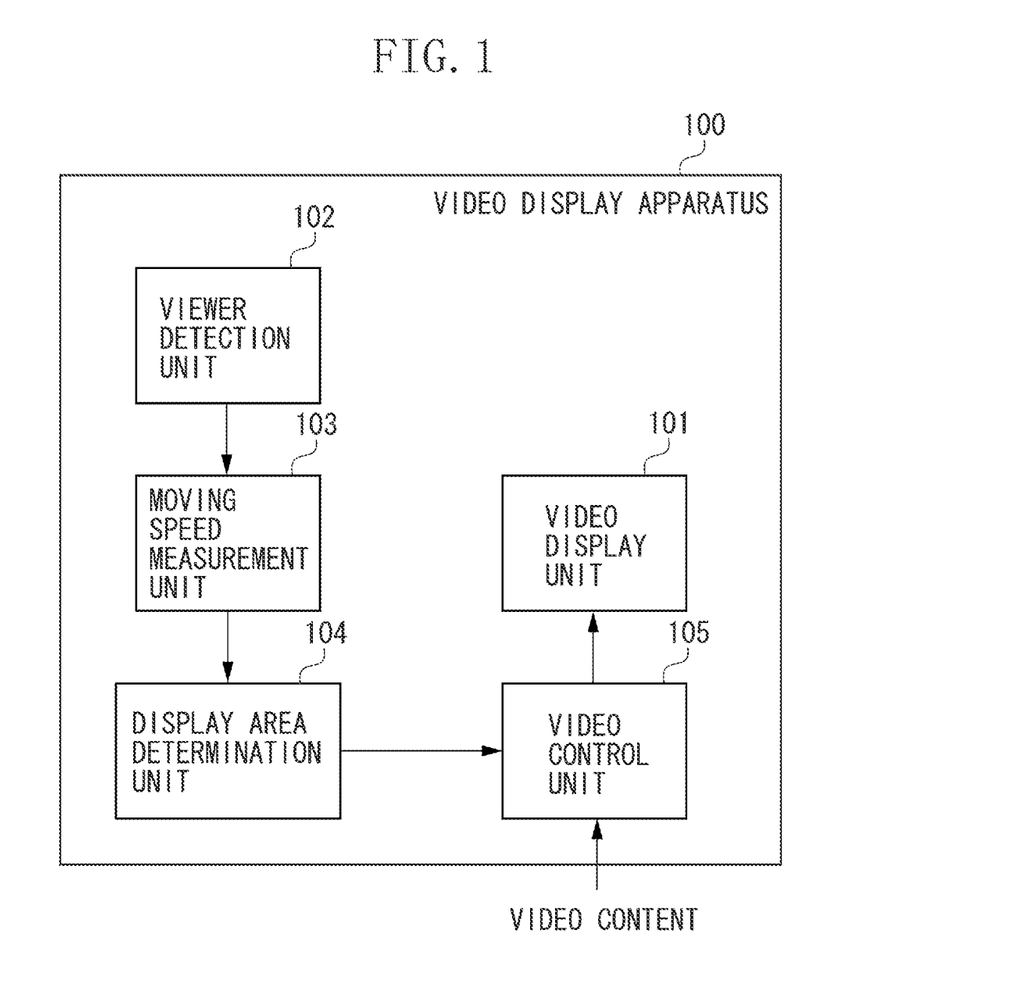
FIG. 1 illustrates a configuration of a video display apparatus according to a first exemplary embodiment.
Figure 2:
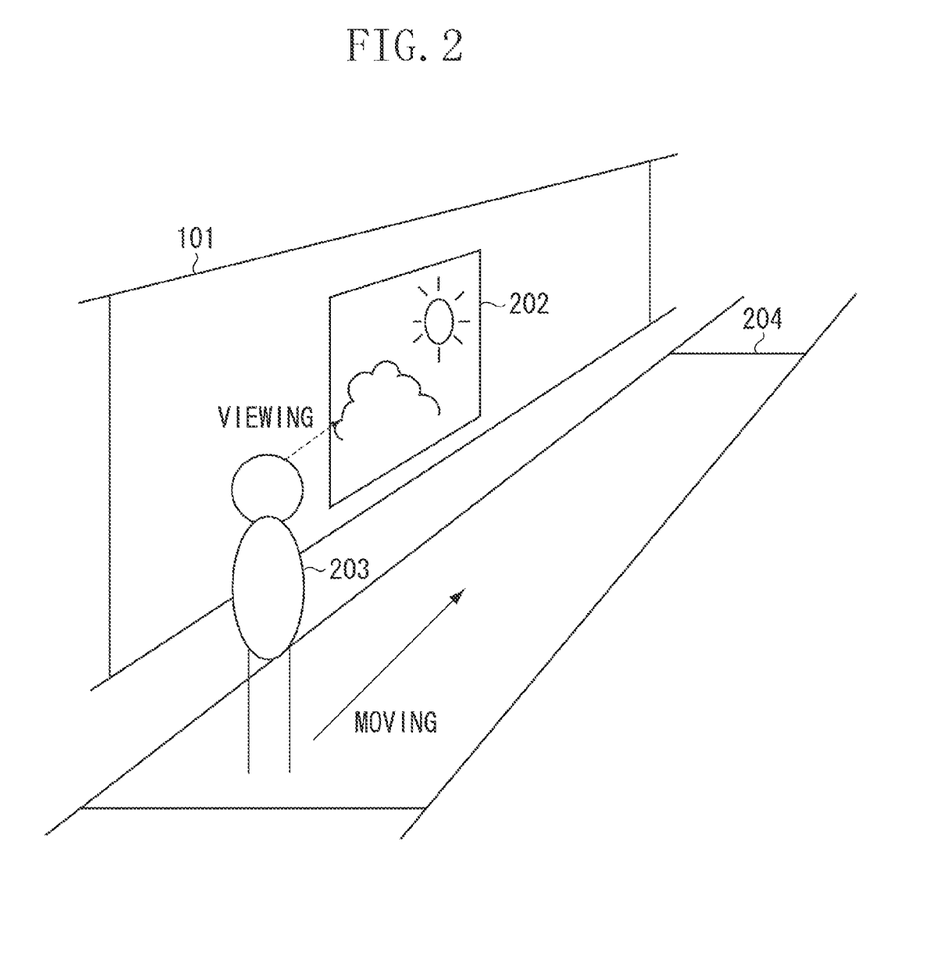
FIG. 2 illustrates how the video display apparatus according to the first exemplary embodiment works.

FIG. 1 illustrates a configuration of a video display apparatus according to a first exemplary embodiment. Further, FIG. 2 illustrates how the video display apparatus according to the first exemplary embodiment works. A video display apparatus 100 includes a video display unit 101, a viewer detection unit 102, a moving speed measurement unit 103, a display area determination unit 104, and a video control unit 105.

The video display unit 101 is a display apparatus represented by an LCD or a PDP. Alternatively, the video display unit 101 may be a projection apparatus represented by a liquid crystal on silicon (LCOS). As illustrated in FIG. 2, the video display unit 101 is set up on a wall of a passageway, and is arranged so that the longitudinal direction of the video display unit 101 becomes the horizontal direction.

The viewer detection unit 102 detects the position of a viewer who is viewing a video image displayed on the video display unit 101. Although the viewer detection unit 102 is not illustrated in FIG. 2, the viewer detection unit 102 detects a person as a viewer present in an area (viewer detection area) 204 a predetermined distance from the video display unit 101, and acquires the coordinate of the viewer. In the present exemplary embodiment, the viewer detection unit 102 acquires a coordinate in the longitudinal direction based on the left end of the video display unit 101 along the horizontal direction relative to the video display unit 101 (this coordinate is herein referred to as "coordinate in the horizontal direction"). The viewer detection unit 102 can fulfill this function according to a known technique such as detection of a person from imaged data acquired by an infrared ray sensor or an imaging apparatus.

The moving speed measurement unit 103 measures the moving speed of the viewer detected by the viewer detection unit 102. In the present exemplary embodiment, the moving speed measurement unit 103 measures the speed of a movement in the horizontal direction relative to the video display unit 101, and the longitudinal direction of the video display unit 101. The moving speed measurement unit 103 measures the moving speed based on, for example, a positional change per unit time, which is transmitted from the viewer detection unit 102. Alternatively, the moving speed measurement unit 103 may measure the moving speed of a viewer with the use of, for example, a known speed sensor such as a sensor configured to measure a speed by utilizing the Doppler effect.

The display area determination unit 104 determines a video display area 202 where a video image is displayed on the video display unit 101 based on the position (coordinate) of the viewer, which is detected by the viewer detection unit 102, and the moving speed of the viewer, which is measured by the moving speed measurement unit 103.

The video control unit 105 controls and displays a video image according to the video display area 202 determined by the display area determination unit 104. The video control unit 105 includes an interface for inputting content from an external source. For example, the interface of the video control unit 105 is a standard interface such as High-Definition Multimedia Interface (HDMI) and Digital Visual Interface (DVI) to allow an input of various kinds of video content. In the present exemplary embodiment, the video control unit 105 has the function of changing a coordinate where an input video image is displayed.

Figure 3:
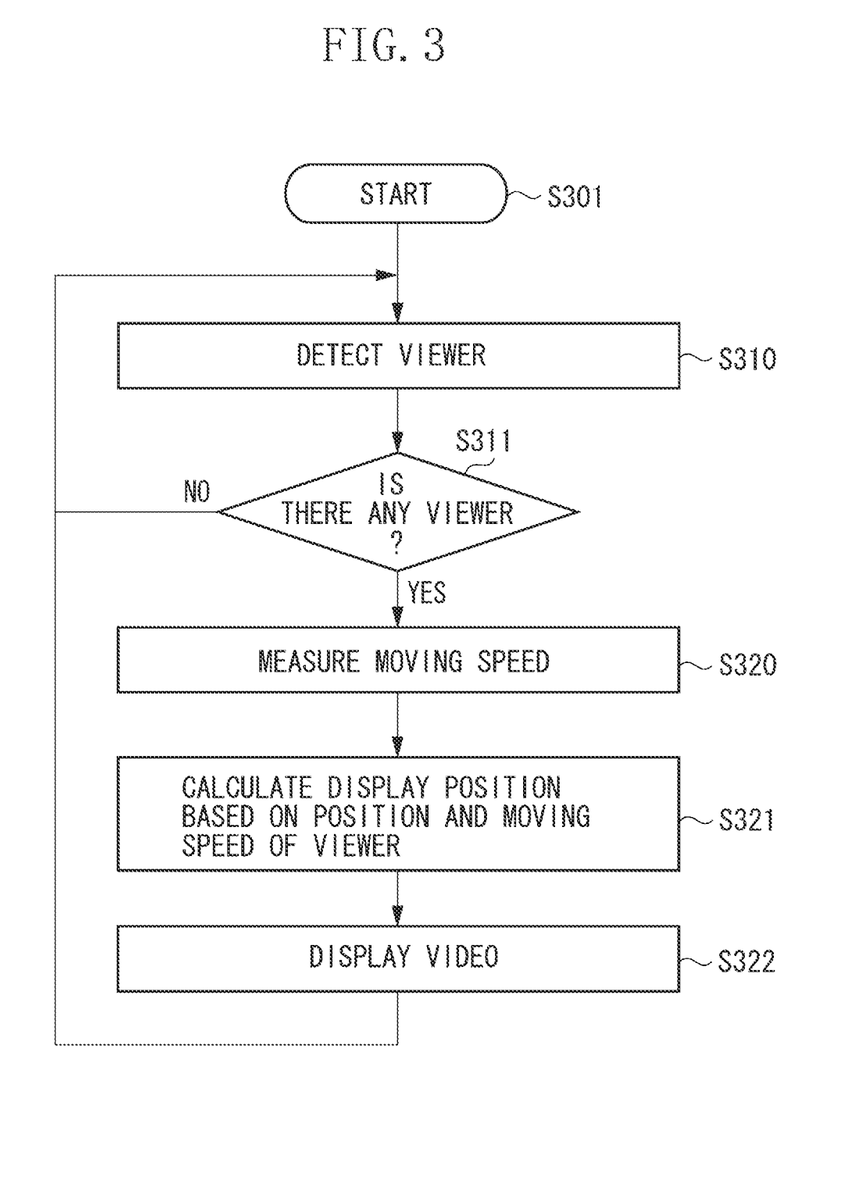
FIG. 3 is a flowchart illustrating video display processing performed by the video display apparatus according to the first exemplary embodiment.

FIG. 3 illustrates video display processing performed by the video display apparatus 100 according to the first exemplary embodiment. Further, FIGS. 4A to 4E illustrate how the video display area 202 is changed according to the position and moving speed of a viewer. FIG. 4A to 4E each illustrates a person passing in front of the video display unit 101 as viewed from above. FIGS. 4A to 4E respectively illustrate [STATE A] to [STATE E], in which viewers are located at different positions and are moving at different speeds.

The video display apparatus 100 starts the processing by performing step S301 in the flowchart of FIG. 3. First, the processing proceeds to step S310, in which the viewer detection unit 102 detects whether a person is present in the viewer detection area 204 and is predetermined distance from the video display unit 101, and acquires the coordinate of the viewer.

In step S311, if the video display apparatus 100 determines that there is no viewer (NO in step S311), the processing proceeds back to step S310. For example, in [STATE A] illustrated in FIG. 4A, since there is no person 403 in the viewer detection area 204, it is determined that there is no viewer, and the processing proceeds back to step S310.

On the other hand, if it is determined in step S311 that there is a viewer (YES in step S311), the processing proceeds to step S320. For example, in [STATE B] illustrated in FIG. 4B, a viewer 413 is present in the view detection area 204 at a position 30 cm past the left end (the lower end in FIGS. 4A to 4E) of the video display unit 101. In this case, the viewer detection unit 102 acquires the coordinate corresponding to 30 cm from the left end of the video display unit 101 as the position of the viewer 413.

In step S320, the moving speed measurement unit 103 measures the moving speed of the viewer. For example, in [STATE B] illustrated in FIG. 4B, the viewer 413 is moving in front of the video display unit 101 in parallel with the video display unit 101 (horizontally relative to the video display unit 101), and the moving speed measurement unit 103 measures the moving speed of the viewer 413 and acquires 50 cm/s as the speed.

Next, the processing proceeds to step S321, in which the display area determination unit 104 determines the video display area 202 on the video display unit 101 based on the position (coordinate) of the viewer, which is detected by the viewer detection unit 102, and the moving speed of the viewer, which is measured by the moving speed measurement unit 103. The display area determination unit 104 determines the video display area 202 in such a manner that the video image is displayed on an area allowing the viewer to glance in the moving direction while viewing the video image. Further, as the viewer is moving at a higher speed, the video image is displayed at a position further away from the viewer so that the viewer can have an enough time to easily avoid an obstacle after the viewer recognizes the obstacle.

In the present exemplary embodiment, the display area determination unit 104 determines a display coordinate X in the horizontal direction based on the coordinate A of the viewer in the horizontal direction and the moving speed S of the viewer according to the following equation (1). In this equation, K represents a coefficient, which is determined in advance based on a time to allow a viewer to easily avoid an obstacle after the viewer recognizes the obstacle. In the present exemplary embodiment, the coefficient K is determined by setting two seconds as the time to allow a viewer to easily avoid an obstacle after the viewer recognizes the obstacle.

$$X = k \cdot S + A \tag{1}$$

Figure 4A:
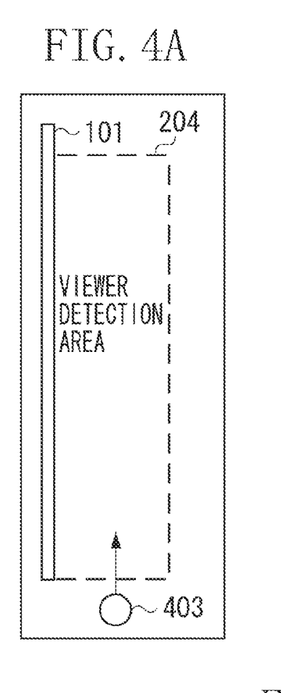
FIGS. 4A to 4E illustrate how a video display area is changed according to the position and moving speed of a viewer.
Figure 4B:
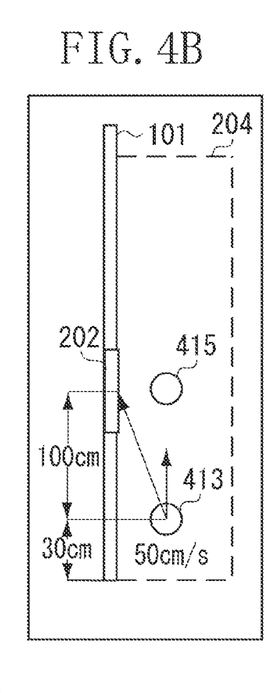

In [STATE B] illustrated in FIG. 4B, the position of the viewer 413 is 30 cm past the left end of the video display unit 101, and the moving speed of the viewer 413 is 50 cm/s. Therefore, the display area determination unit 104 determines the display coordinate X as X=2·50+30=130 according to the above-described equation (1), and determines the video display area 202 as being 130 cm from the left end of the video display unit 101. This video display area 202 is located horizontally away from the coordinate of the viewer 413 by 100 cm. In the present exemplary embodiment, the position determined by the above-described equation (1) is set as the central position of the video display area 202.

Next, the processing proceeds to step S322, in which the video control unit 105 displays the video image on the video display area 202 determined in step S321. In [STATE B] illustrated in FIG. 4B, the video control unit 105 displays the video image on the video display area 202 130 cm from the left end of the video display unit 101. Displaying the video image 100 cm ahead of the viewer 413 allows an obstacle 415, such as a person, positioned approximately 100 cm ahead of the viewer 413 to easily enter the field of view of the viewer 413, even while the viewer 413 is paying close attention to the video image. Since the viewer 413 is moving at a speed of 50 cm/s, the viewer 413 is provided two seconds to avoid the obstacle 415 positioned approximately 100 cm ahead of the viewer 413 after the viewer 413 visually recognizes the obstacle 415.

Figure 4C:
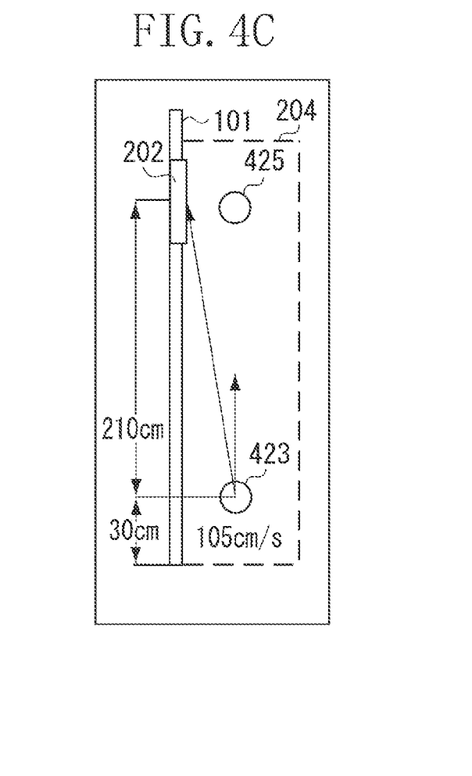

In [STATE C] illustrated in FIG. 4C, a viewer 423 is moving quicker than the viewer 413 in [STATE B] illustrated in FIG. 4B. In this case, in step S310, the viewer detection unit 102 acquires the coordinate of the position 30 cm from the left end of the video display unit 101 as the position of the viewer 423. Further, in step S320, the moving speed measurement unit 103 measures the moving speed of the viewer 423 and acquires 105 cm/s as the moving speed.

Then, in step S321, the display area determination unit 104 determines the display coordinate X as X=2·105+30=240 according to the above-described equation (1), and determines the video display area 202 as being 240 cm away from the left end of the video display unit 101. This video display area 202 is located horizontally away from the coordinate of the viewer 423 by 210 cm. Also in this case, as is the case with [STATE B] illustrated in FIG. 4B, the viewer 423 is provided two seconds to avoid an obstacle 425 positioned approximately 210 cm ahead of the viewer 423 after the viewer 423 visually recognizes the obstacle 425.

Figure 4D:
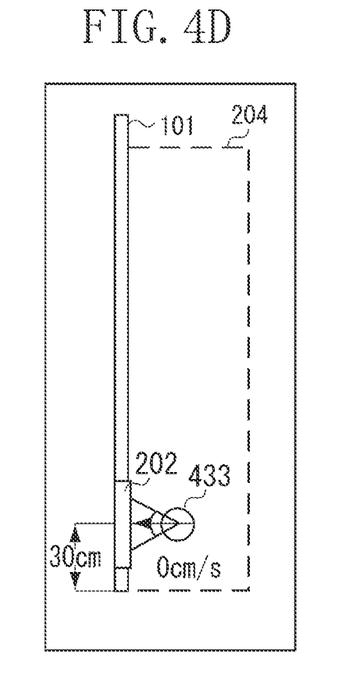

In [STATE D] illustrated in FIG. 4D, a viewer 433 is not moving. In this case, in step S310, the viewer detection unit 102 acquires the coordinate of the position 30 cm from the left end of the video display unit 101 as the position of the viewer 433. Further, in step S320, the moving speed measurement unit 103 measures the moving speed of the viewer 433 and acquires 0 cm/s as the moving speed.

Then, in step S321, the display area determination unit 104 determines the display coordinate X as X=2·0+30=30 according to the above-described equation (1), and determines the video display area 202 as being 30 cm from the left end of the video display unit 101. This video display area 202 is in front of the viewer 433. Since the viewer 433 is not moving, the viewer 433 does not have to worry about the possibility of colliding with an obstacle. Therefore, a video image is displayed in front of the viewer 433 where the viewer 433 can have the best visibility.

Figure 4E:
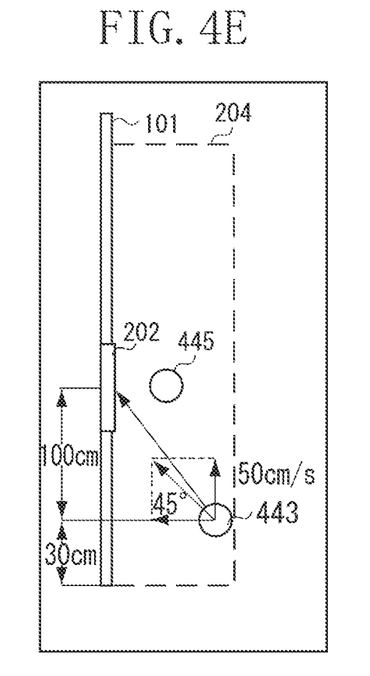

In [STATE E] illustrated in FIG. 4E, a viewer 443 is not moving parallel to the video display unit 101. In this case, in step S310, the viewer detection unit 102 acquires the coordinate 30 cm from the left end of the video display unit 101 as the position of the viewer 443. Further, in step S320, the moving speed measurement unit 103 measures the moving speed of the viewer 443 and acquires 50 cm/s as the moving speed. In a case where the moving speed measurement unit 103 measures the moving speed from a change in the viewer's position per unit time, which is transmitted from the viewer detection unit 102, this moving speed is the speed of a movement in the horizontal direction relative to the video display unit 101, and therefore the value is directly set as the moving speed of the viewer 443. Furthermore, in a case where the moving speed measurement unit 103 measures the moving speed of the viewer 443 itself, the moving speed measurement unit 103 divides the moving speed into a speed in the horizontal direction and a speed in the perpendicular direction relative to the video display unit 101, and sets the moving speed in the horizontal direction as the moving speed of the viewer 443.

Then, in step S321, the display area determination unit 104 determines the display coordinate X as X=2·50+30=130 according to the above-described equation (1), and determines the video display area 202 as being 130 cm from the left end of the video display unit 101. This video display area 202 is in the position horizontally away from the coordinate of the viewer 443 by 100 cm. Also in this case, as is the case with [STATE B] illustrated in FIG. 4B, the viewer 443 is provided two seconds for the viewer 443 to avoid an obstacle 445 positioned approximately 100 cm ahead of the viewer 443 after the viewer 443 visually recognizes the obstacle 445.

According to the present exemplary embodiment, as mentioned above, even when a viewer is moving, the viewer can view a video image and the direction in which the viewer is moving. As a result, it is possible to provide a video image while reducing the possibility that a moving viewer collides with an obstacle.

A second exemplary embodiment will be described as an example of changing the display size of the video display area 202 according to the moving speed of a viewer. The configuration of a video display apparatus according to the second exemplary embodiment is similar to the configuration of the video display apparatus 100 according to the first exemplary embodiment, therefore, a detailed description is omitted herein. However, in the second exemplary embodiment, the display area determination unit 104 includes the function of determining not only the position of the video display area 202 as described in the first exemplary embodiment, but also the width and height of the video display area 202.

Figure 5A:
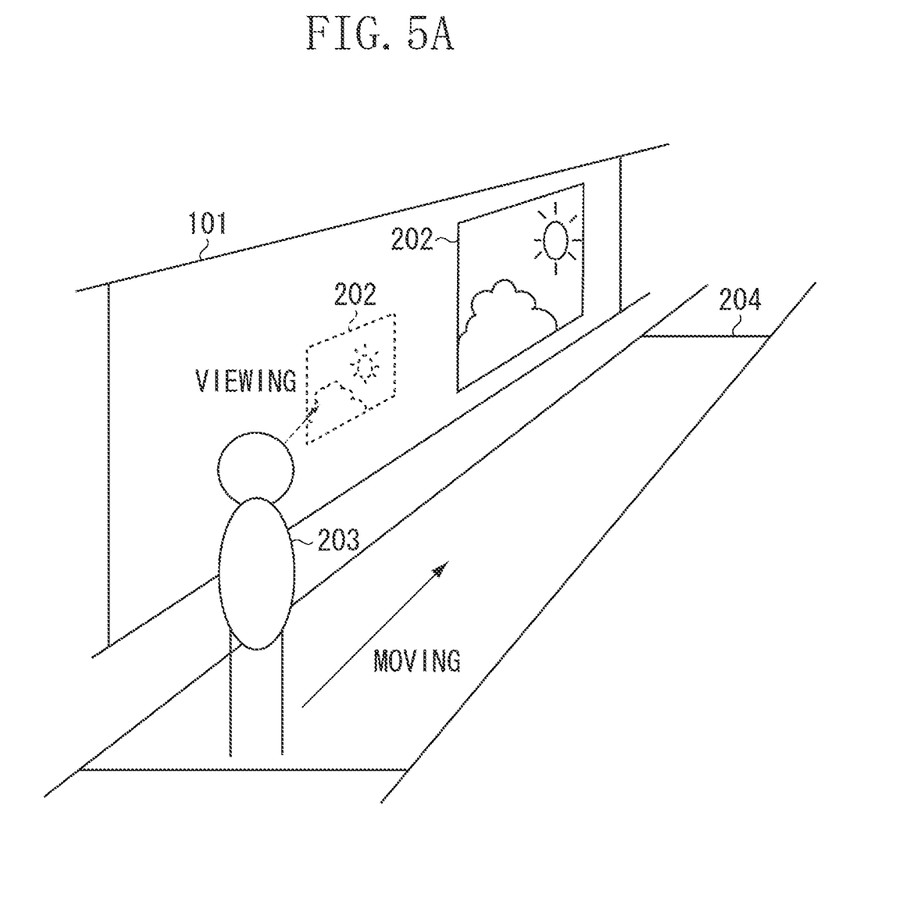
FIGS. 5A to 5C illustrate how a video display apparatus according to a second exemplary embodiment works, and how a video display area is changed according to the position and moving speed of a viewer.
Figure 5B:
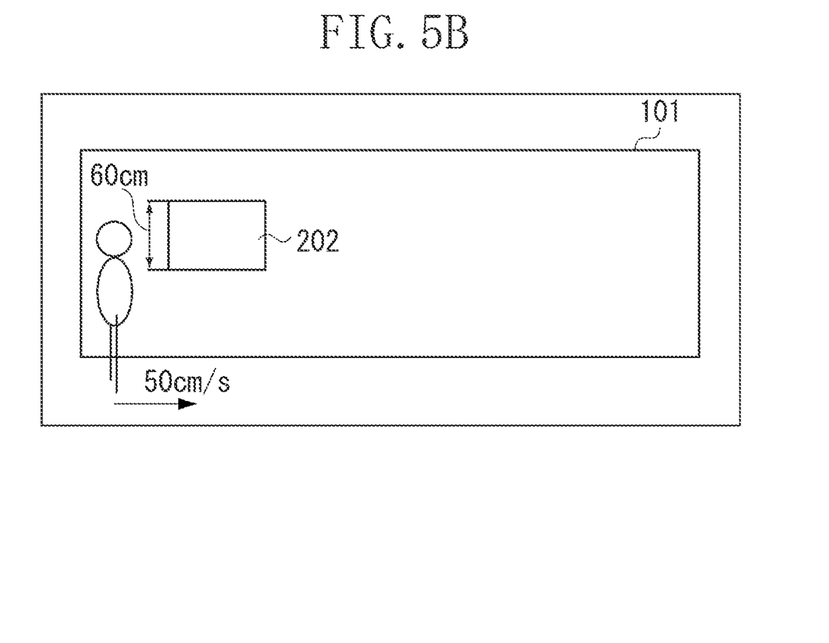
Figure 5C:
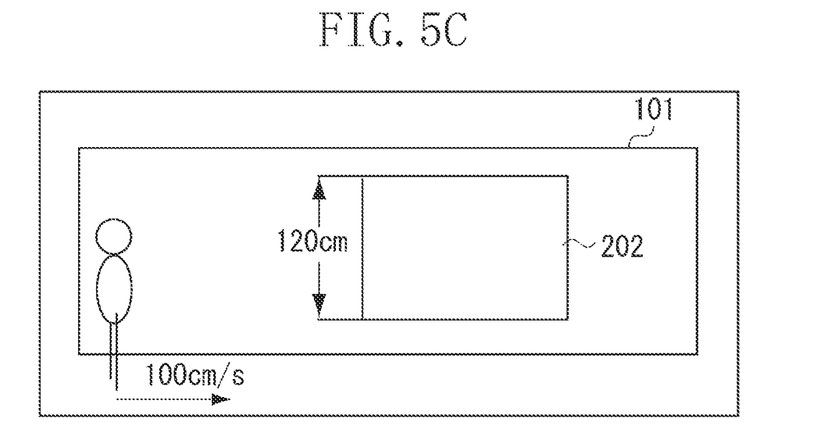

FIGS. 5A to 5C illustrate how the video display apparatus according to the second exemplary embodiment works, and how the video display area 202 is changed according to the position and moving speed of a viewer. FIG. 5A illustrates an outline view. FIGS. 5B and 5C respectively illustrate [STATE F] and [STATE G], in which a viewer 203 is moving at different speeds.

The video display processing performed by the video display apparatus according to the second exemplary embodiment is similar to the processing according to the first exemplary embodiment, therefore, a detailed description is omitted herein. However, in step S321, the display area determination unit 104 determines the position, the width, and the height of the video display area 202 based on the position (coordinate) of the viewer 203, which is detected by the viewer detection unit 102, and the moving speed of the viewer 203, which is measured by the moving speed measurement unit 103. The method of determining the position of the video display area 202 is the same as that in the first exemplary embodiment. In the present exemplary embodiment, the display area determination unit 104 determines the height h of the video display area 202 according to the moving speed S of the viewer 203 according to the following equations (2) and (3). The display area determination unit 104 changes the width w of the video display area 202 so as to maintain the aspect ratio relative to the height h calculated according to equations (2) and (3). In equations (2) and (3), K represents a coefficient which is determined in advance based on a time to allow a viewer to easily avoid an obstacle after the viewer recognizes the obstacle. Sd represents a threshold value for the moving speed. If the moving speed S of a viewer exceeds the threshold value Sd, the height h is changed. If the moving speed S of a viewer is below the threshold value Sd, a height hd, which is an initial value, is set as the height h without being changed.

$$h=hd(S \leq Sd) \quad (2)$$

$$h=hd \cdot (S/Sd)(S>Sd) \quad (3)$$

For example, if the threshold value Sd is 50 cm/s, the height hd of the initial value is 60 cm, and the moving speed S of the viewer 203 is any value from 0 cm/s, which is a stationary state, to 50 cm/s, the height h is determined as 60 cm. When the viewer 203 is moving at a moving speed of 50 cm/s as indicated in [STATE F] illustrated in FIG. 5B, the height h of the video display area 202 is determined as 60 cm. When the viewer 203 is moving at a moving speed higher than 50 cm/s, the height h is determined by the above-described equation (3). When the viewer 203 is moving at a moving speed of 100 cm/s as indicated in [STATE G] illustrated in FIG. 5C, the height h of the video display area 202 is determined as follows; h=60·(100/50)=120 cm. In this way, even if the moving speed S of a viewer speeds up, so that the video display area 202 is located further ahead of the viewer, enlarging the video display area 202 helps in maintaining the viewer's visibility. Therefore, it is possible to provide a video image while reducing the possibility that a moving viewer collides with an obstacle.

A third exemplary embodiment will be described as an example of changing the display size of the video display area 202 according to the moving speed of a viewer, and further applying a trapezoidal correction to the video display area 202. The configuration of a video display apparatus according to the third exemplary embodiment is similar to the configuration of the video display apparatus according to the first exemplary embodiment, therefore, a detailed description is omitted herein. However, in the third exemplary embodiment, the display area determination unit 104 includes the function of determining not only the position of the video display area 202 as described in the first exemplary embodiment, but also the width and height of the video display area 202, and further applying a trapezoidal correction to the video display area 202.

The video display processing performed by the video display apparatus according to the third exemplary embodiment is similar to the processing according to the first exemplary embodiment, therefore, a detailed description is omitted herein. However, in step S310, the viewer detection unit 102 detects not only the coordinate of the viewer in the horizontal direction but also the distance from the video display unit 101 to the viewer. Further, in step S321, the display area determination 104 determines the position, the width, and the height of the video display area 202 based on the position (coordinate) of the viewer, which is detected by the viewer detection unit 102, and the moving speed of the viewer, which is measured by the moving speed measurement unit 103, and then applies a trapezoidal correction to the video display area 202. to the method to determine the position of the video display area 202 is the same as the first exemplary embodiment, and therefore, a detailed description is omitted herein. Further, the method to determine the width and the height of the video display area 202 is the same as the second exemplary embodiment, and therefore, a detailed description is omitted herein.

Figure 6A:
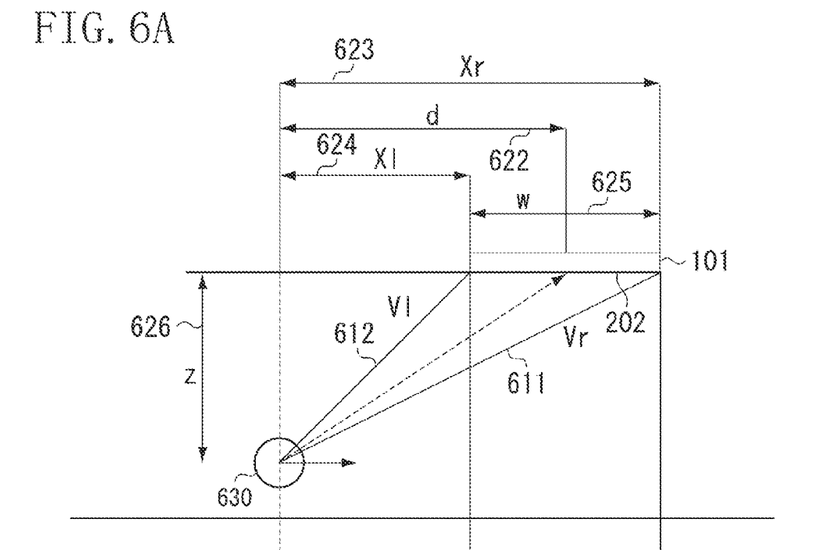
Figure 6B:
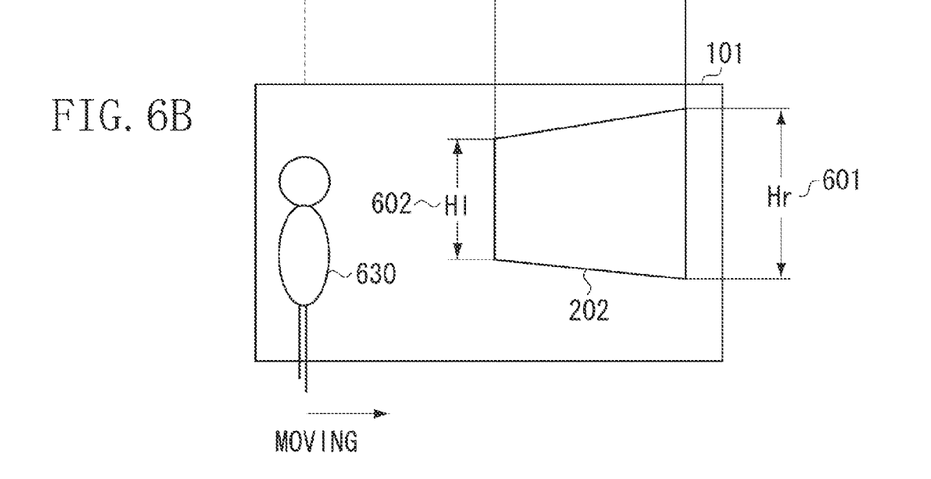

Referring to FIGS. 6A and 6B, an example of the trapezoidal correction performed in step S321 will be described. A viewer 630 is present in front of the video display unit 101. The present exemplary embodiment determines a height Hl (602) of the left end of the video display area 202 and a height Hr (601) of the right end of the video display area 202, based on the ratio of a distance Vl (612) from the viewpoint of the viewer 630 to the left end of the video display area 202, and a distance Vr (611) from the viewpoint of the viewer 630 to the right end of the video display area 202, as expressed by the following equation (4).

$$Vl:Vr=Hl:Hr \qquad (4)$$

First, the display area determination unit 104 determines a position d (622) of the video display area 202 based on the position and the moving speed of the viewer 630. The determination method is the same as the first exemplary embodiment, and calculated according to the equation (1). Next, the display area determination unit 104 determines the height Hr (601) of the right end of the video display area 202 according to the moving speed S of the viewer 630. The determination method is the same as the second exemplary embodiment, and uses equation (2) or (3) to calculate it. Further, the display area determination unit 104 calculates the width w so as to maintain the aspect ratio relative to the height Hr (601) of the right end of the video display area 202.

Next, the display area determination unit 104 calculates a distance Xr (623) from the viewer 630 to the right end of the video display area 202, and a distance Xl (624) from the viewer 630 to the left end of the video display area 202 with use of the coordinate of the viewer 630 in the horizontal direction. The distances Xr (623) and Xl (624) from the coordinate of the viewer in the horizontal direction to the right and left ends of the video display area 202 are calculated by the following equations (5) and (6), respectively.

$$Xr=d+(w/2) \qquad (5)$$

$$Xl=d-(w/2) \qquad (6)$$

Next, the display area determination unit 104 calculates the distances Vl (612) and Vr (611) from the viewpoint of the viewer 630 to the left and right ends of the video display area 202, with use of the distance z (626) between the viewer 630 and the video display unit 101, which is detected in step S310, and the distances Xr and Xl from the coordinate of the viewer 630 in the horizontal direction to the left and right ends of the video display area 202.

$$Vr=\mathrm{SQRT}(Z^2+Xr^2) \qquad (7)$$

$$Vl=\mathrm{SQRT}(Z^2+Xl^2) \qquad (8)$$

The display area determination unit 104 calculates the height Hl with use of the ratio of the distances Vl and Vr from the viewpoint of the viewer 630 to the left and right ends of the video display area 202, and the already calculated height Hr of the right end of the video display area 202, according to the above-described equation (4). Applying the trapezoidal correction to the video display area 202 in this way can improve the viewer's visibility to the video image. Therefore, it is possible to provide a video image while reducing the possibility that a moving viewer collides with an obstacle.

Figure 7:
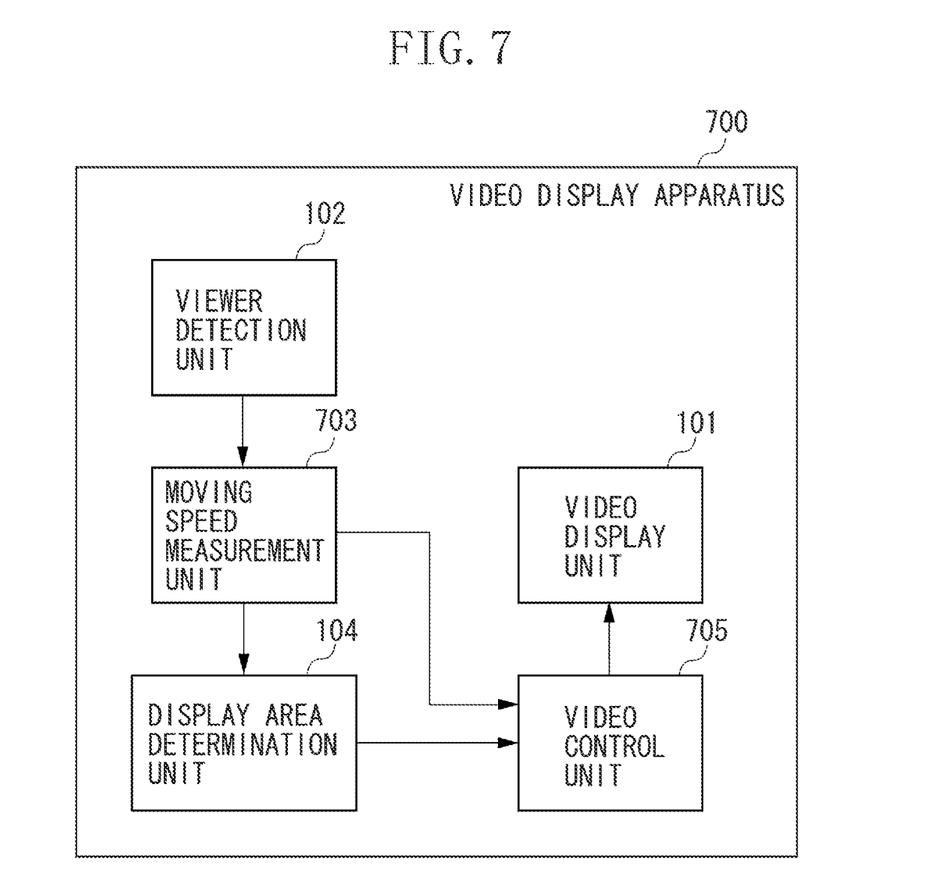
FIG. 7 illustrates a configuration of a video display apparatus according to a fourth exemplary embodiment.

A fourth exemplary embodiment will be described as an example of changing a display content of a video image to be displayed on the video display area 202 according to the moving speed of a viewer. FIG. 7 illustrates a configuration of a video display apparatus according to the fourth exemplary embodiment. A video display apparatus 700 includes the video display unit 101, the viewer detection unit 102, a moving speed measurement unit 703, the display area determination unit 104, and a video control unit 705. Although the video display unit 101, the viewer detection unit 102, the moving speed measurement unit 703, and the display area determination unit 104 are the same as those in the first exemplary embodiment, the video control unit 705 has the function of selecting a display content according to the moving speed of a viewer which is input from the moving speed measurement unit 703.

The video display processing performed by the video display apparatus according to the fourth exemplary embodiment is similar to the processing according to the first exemplary embodiment, therefore, a detailed description is omitted herein. However, in step S322, the video control unit 705 changes a display content according to the moving speed of the viewer when the video control unit 705 displays a video image on the video display area 202 determined in step S321. For example, if the viewer is moving at a moving speed lower than 50 cm/s, the video control unit 705 displays a moving image. On the other hand, if the viewer is moving at a moving speed equal to or higher than 50 cm/s, the video control unit 705 switches the display content to a still image.

Further, if the video control unit 705 displays a plurality of still images while switching them, the speed at which the still image contents are switched may be changed according to the moving speed. If the viewer is moving at a moving speed equal to or lower than 50 cm/s, the video control unit 705 switches the still image contents every ten seconds. On the other hand, if the viewer is moving at a moving speed equal to or higher than 50 cm/s, the video control unit 705 switches the still image contents every twenty seconds.

In this way, the video control unit 705 has the function of switching the display content to a content having a small amount of information such that the content can transmit information even if the viewer is not paying close attention thereto when a viewer is moving at a high speed. Further, the video control unit 705 may switch the number of characters and the font size to be displayed according to the moving speed of a viewer. When a viewer is moving at a high speed and the video display area 202 is located ahead of the viewer, reducing the number of characters helps the information to be transmitted to the viewer while reducing a time during which the viewer should pay close attention thereto. Further, increasing the font size can improve the visibility which would otherwise be deteriorated in this case. Conversely, when a viewer is moving at a low speed and the display area is located near the viewer, the video control unit 705 displays a video image with an increased number of characters and a reduced font size. A low moving speed can reduce the possibility that the viewer collides with an obstacle ahead, and therefore the video control unit 705 displays a content having a large amount of information.

In this way, it is possible to display a content having an appropriate amount of information according to the moving speed of a viewer. Therefore, it is possible to provide a video image while reducing the possibility that a moving viewer collides with an obstacle.

A fifth exemplary embodiment will be described as an example of correcting the luminance of a video image to be displayed on the video display area 202 according to the moving speed of a viewer. The configuration of a video display apparatus according to the fifth exemplary embodiment is similar to the configuration of the video display apparatus according to the fourth exemplary embodiment, therefore, a detailed description is omitted herein. However, the video control unit 705 has the function of correcting the luminance of a video image to be displayed on the video display area 202 according to the moving speed of a viewer, which is input from the moving speed measurement unit 703.

The video display processing performed by the video display apparatus according to the fifth exemplary embodiment is similar to the processing according to the first exemplary embodiment, therefore, a detailed description is omitted herein. However, in step S322, the video control unit 705 corrects the luminance of a video image to be displayed on the video display area 202 according to the moving speed of the viewer, when the video control unit 705 displays the video image on the video display area 202 determined in step S321. In the present exemplary embodiment, the video control unit 705 determines a luminance correction amount L based on the moving speed S of the viewer with use of the following equation (9). In this equation, K represents a coefficient which is determined in advance based on a time to allow a viewer to easily avoid an obstacle after the viewer recognizes it. J represents a coefficient determined by the system.

$$L = J \cdot (K \cdot S)2 \quad (9)$$

In this way, even if a viewer is moving at a higher speed, so that a video image is displayed further ahead, it is possible to maintain the viewer's visibility by correcting the luminance. Therefore, it is possible to provide a video image while reducing the possibility that a moving viewer collides with an obstacle.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-265343 filed Nov. 29, 2010, which is hereby incorporated by reference herein in its entirety.

What is claimed is:

1. A display apparatus comprising:
    a display unit configured to display an image;
    a detection unit configured to detect a position of a predetermined object;
    a moving speed acquiring unit configured to acquire a moving speed of the predetermined object;
    a display area determination unit configured to determine, based on the position and moving speed of the predetermined object, an image display area where the image is displayed by the display unit such that, in a case where the moving speed acquired by the moving speed acquiring unit is a first moving speed higher than a second moving speed, the image display area determined by the display area determination unit based on the first moving speed is positioned farther away from the predetermined object than an image display area determined based on the second moving speed; and
    a display control unit configured to display the image in the image display area determined by the display area determination unit.

2. The display apparatus according to claim 1, wherein the display area determination unit determines that the image display area is to be positioned further away from the predetermined object as the moving speed of the predetermined object increases.

3. The display apparatus according to claim 1, wherein the display area determination unit applies a trapezoidal correction to the display area based on the moving speed of the predetermined object.

4. The display apparatus according to claim 1, wherein the display control unit changes a content to be displayed in the image display area based on the moving speed of the predetermined object.

5. The display apparatus according to claim 1, wherein the display control unit changes at least one of a number of characters and a font size to be displayed in the image display area based on the moving speed of the predetermined object.

6. The display apparatus according to claim 1, wherein the display control unit changes a luminance of the image to be displayed in the image display area based on the moving speed of the predetermined object.

7. A display method for displaying an image on a display unit, the display method comprising:
    detecting a position of a predetermined object;
    acquiring a moving speed of the predetermined object;
    determining, based on the position and moving speed of the predetermined object, an image display area where the image is displayed by the display unit such that, in a case where the moving speed acquired by the acquiring step is a first moving speed higher than a second moving speed, the image display area determined by the determining step based on the first moving speed is farther away from the predetermined object than an image display area determined based on the second moving speed; and
    displaying the image in the determined image display area.

8. The display method according to claim 7, wherein the determining step determines the display area to be positioned further away from the predetermined object as the moving speed of the predetermined object increases.

9. The display method according to claim 7, wherein the determining step applies a trapezoidal correction to the image display area based on the moving speed of the predetermined object.

10. The display method according to claim 7, wherein the displaying step changes a content to be displayed in the image display area based on the moving speed of the predetermined object.

11. The display method according to claim 7, wherein the displaying step changes at least one of a number of characters and a font size to be displayed in the image display area based on the moving speed of the predetermined object.

12. The display method according to claim 7, wherein the displaying step changes a luminance of the image to be displayed in the image display area based on the moving speed of the predetermined object.

13. A computer readable storage medium storing a control program for causing a computer to perform operations for displaying an image on a display unit, the operations comprising:
   detecting a position of a predetermined object;
   acquiring a moving speed of the predetermined object;
   determining, based on the position and moving speed of the predetermined object, a display area where the image is displayed by the display unit such that, in a case where the moving speed acquired by the acquiring step is a first moving speed higher than a second moving speed, the image display area determined by the determining step based on the first moving speed is farther away from the predetermined object than an image display area determined based on the second moving speed; and
   displaying the image in the determined display area.

14. A display control apparatus comprising:
   a display unit configured to display an image;
   an acquiring unit configured to acquire a moving speed of a predetermined object;
   a determination unit configured to determine a content to be displayed by the display unit based on the moving speed of the predetermined object, wherein the determination unit determines that a first content is to be displayed in a case where the moving speed of the predetermined object is higher than a predetermined moving speed and determines that a second content including a larger amount of characters than the first content is to be displayed in a case where the moving speed of the predetermined object is lower than the predetermined moving speed;
   a display control unit configured to display the content determined by the determination unit.

15. The display control apparatus according to claim 14, wherein the first content is a moving image the second content is a still image.

16. The display control method comprising:
   acquiring a moving speed of a predetermined object;
   determining a content to be displayed based on the moving speed of the predetermined object, wherein the determining step determines that a first content is to be displayed in a case where the moving speed of the predetermined object is higher than a predetermined moving speed and determines that a second content including a larger amount of characters than the first content is to be displayed in a case where the moving speed of the predetermined object is lower than the predetermined moving speed; and
   displaying the content determined by the determining step.

17. The method according to claim 16, first content is a moving image the second content is a still image.

18. A computer readable storage medium storing a control program for causing a computer to perform operations comprising:
   acquiring a moving speed of a predetermined object;
   determining a content to be displayed based on the moving speed of the predetermined object, wherein the determining step determines that a first content is to be displayed in a case where the moving speed of the predetermined object is higher than a predetermined moving speed and determines that a second content including a larger amount of characters than the first content is to be displayed in a case where the moving speed of the predetermined object is lower than the predetermined moving speed; and
   displaying the content determined by the determining step.

19. The computer readable storage medium according to claim 18, wherein the first content is a moving image the second content is a still image.

20. The computer readable storage medium according to claim 14, wherein the determining step applies a trapezoidal correction to the display area based on the moving speed of the predetermined object.

21. The computer readable storage medium according to claim 14, wherein the display control unit changes a content to be displayed in the image display area based on the moving speed of the predetermined object.

* * * * *